United States Patent
Ivanov et al.

(10) Patent No.: US 8,028,200 B2
(45) Date of Patent: Sep. 27, 2011

(54) TRACING OPERATIONS IN MULTIPLE COMPUTER SYSTEMS

(75) Inventors: Ventsislav Ivanov, Sofia (BG); Gorka Ivanova, Sofia (BG); Simeon Stefanov, Sofia (BG); Hristo Dobtchev, Sofia (BG); Hristo Shekov, Sofia (BG); Aleksander Naydenov, Stambolijski (BG); Georgi Mihailov, Pleven (BG)

(73) Assignee: SAP AG, Walldorf (DE)

( * ) Notice: Subject to any disclaimer, the term of this patent is extended or adjusted under 35 U.S.C. 154(b) by 1033 days.

(21) Appl. No.: 11/540,348

(22) Filed: Sep. 29, 2006

(65) Prior Publication Data

US 2008/0155348 A1 Jun. 26, 2008

(51) Int. Cl.
*G06F 11/00* (2006.01)
(52) U.S. Cl. .................................. 714/45; 717/128
(58) Field of Classification Search ............... 714/45; 717/128
See application file for complete search history.

(56) References Cited

U.S. PATENT DOCUMENTS

| | | | |
|---|---|---|---|
| 5,371,883 A * | 12/1994 | Gross et al. | 714/38 |
| 5,642,478 A * | 6/1997 | Chen et al. | 714/45 |
| 5,896,536 A | 4/1999 | Lindsey | |
| 6,202,199 B1 | 3/2001 | Wygodny et al. | |
| 6,526,371 B1 | 2/2003 | Klein et al. | |
| 6,658,416 B1 | 12/2003 | Hussain et al. | |
| 6,678,883 B1 | 1/2004 | Berry et al. | |
| 6,708,173 B1 | 3/2004 | Behr et al. | |
| 6,766,511 B1 | 7/2004 | Berry et al. | |
| 6,802,054 B2 * | 10/2004 | Faraj | 717/128 |
| 7,003,781 B1 * | 2/2006 | Blackwell et al. | 719/327 |
| 7,140,025 B1 * | 11/2006 | Dillow et al. | 719/313 |
| 7,165,190 B1 | 1/2007 | Srivastava et al. | |
| 7,194,664 B1 * | 3/2007 | Fung et al. | 714/45 |
| 7,200,588 B1 | 4/2007 | Srivastava et al. | |
| 7,337,349 B2 * | 2/2008 | Brauneis et al. | 714/4 |
| 7,380,239 B1 * | 5/2008 | Srivastava et al. | 717/128 |
| 7,392,505 B2 * | 6/2008 | Ciapala et al. | 717/106 |
| 7,441,234 B2 | 10/2008 | Cwalina et al. | |
| 7,640,459 B2 | 12/2009 | Ivanov et al. | |
| 2003/0009507 A1 * | 1/2003 | Shum | 709/104 |
| 2003/0061550 A1 * | 3/2003 | Ng et al. | 714/45 |
| 2003/0065764 A1 * | 4/2003 | Capers et al. | 709/224 |
| 2003/0088854 A1 | 5/2003 | Wygodny et al. | |
| 2003/0212928 A1 * | 11/2003 | Srivastava et al. | 714/47 |
| 2004/0010570 A1 * | 1/2004 | Kaler et al. | 709/220 |
| 2004/0117768 A1 * | 6/2004 | Chang et al. | 717/125 |

(Continued)

OTHER PUBLICATIONS

Non-Final Office Action for U.S. Appl. No. 11/541,119 Mailed Feb. 4, 2010, 19 Pages.

(Continued)

*Primary Examiner* — Scott Baderman
*Assistant Examiner* — Chae Ko
(74) *Attorney, Agent, or Firm* — Blakely, Sokoloff, Taylor & Zafman (57) ABSTRACT

A method and apparatus for tracing operations in multiple computer systems. An embodiment of a method includes running a computer application, where the computer application operates on multiple computer systems, including a first system and a second system. The first system and the second system have different computer environments. A trace of the computer application is performed, with performance of the trace including enabling a first trace of the first system and enabling a second trace of the second system. Trace data is collected from the first system and the second system during the operation of the application, and the trace data from the first system and the trace data from the second system are combined.

19 Claims, 7 Drawing Sheets

U.S. PATENT DOCUMENTS

| | | | |
|---|---|---|---|
| 2004/0153881 A1* | 8/2004 | Arend | 714/48 |
| 2004/0158819 A1* | 8/2004 | Cuomo et al. | 717/128 |
| 2004/0194066 A1* | 9/2004 | Frey et al. | 717/127 |
| 2004/0210877 A1 | 10/2004 | Sluiman et al. | |
| 2004/0220947 A1* | 11/2004 | Aman et al. | 707/100 |
| 2005/0060408 A1* | 3/2005 | McIntyre et al. | 709/225 |
| 2005/0091373 A1 | 4/2005 | Ciapala et al. | |
| 2005/0120341 A1* | 6/2005 | Blumenthal et al. | 717/158 |
| 2005/0132337 A1 | 6/2005 | Wedel et al. | |
| 2005/0283673 A1* | 12/2005 | Ode | 714/31 |
| 2006/0015612 A1* | 1/2006 | Shimazaki et al. | 709/224 |
| 2006/0085798 A1* | 4/2006 | Bendiksen et al. | 719/318 |
| 2006/0229064 A1 | 10/2006 | Pitkamaki et al. | |
| 2006/0288149 A1* | 12/2006 | LaVigne et al. | 710/306 |
| 2007/0143795 A1* | 6/2007 | Tran | 725/46 |
| 2007/0260668 A1* | 11/2007 | Chen et al. | 709/201 |
| 2008/0098358 A1 | 4/2008 | Shekov | |
| 2008/0098359 A1 | 4/2008 | Ivanov et al. | |
| 2008/0127108 A1 | 5/2008 | Ivanov et al. | |
| 2008/0127110 A1 | 5/2008 | Ivanov et al. | |
| 2008/0155348 A1 | 6/2008 | Ivanov et al. | |
| 2008/0155349 A1 | 6/2008 | Ivanov et al. | |
| 2008/0155350 A1 | 6/2008 | Ivanov et al. | |

OTHER PUBLICATIONS

Non-Final Office Action for U.S. Appl. No. 11/540,028, Mailed Mar. 26, 2010, 29 Pages.

Non-Final Office Action for U.S. Appl. No. 11/529,978, Mailed Mar. 29, 2010, 26 Pages.

Non-Final Office Action for U.S. Appl. No. 11/529,980 Mailed Apr. 26, 2010, 23 Pages.

Final Office Action for U.S. Appl. No. 11/540,028, Mailed Jul. 30, 2010, 16 Pages.

Final Office Action for U.S. Appl. No. 11/541,119 Mailed Aug. 2, 2010, 16 Pages.

Final Office Action for U.S. Appl. No. 11/529,980 Mailed Aug. 4, 2010, 17 Pages.

Final Office Action for U.S. Appl. No. 11/529,978, Mailed Aug. 3, 2010, 16 Pages.

Borgeest, Rolf, et al., "A trace based performance evaluation tool for parallel real time systems", Nov. 2, 1994, 14 Pages.

Dufour, Bruno, et al., "J: A Tool for Dynamic Analysis of Java Programs", McGill University, Oct. 2003, 2 Pages.

Harkema, M, et al., "Performance Monitoring of Java Applications", University of Twente Netherlands, Jul. 2002, 14 Pages.

Turner, J D., et al., "Application Response Measurement of Distributed Web Services", IBM TJ Watson Research Center, 2002, 12 Pages.

Notice of Allowance and Fees for U.S. Appl. No. 11/529,978, Mailed Jan. 7, 2011, 18 Pages.

Notice of Allowance for U.S. Appl. No. 11/541,119, Mailed Feb. 3, 2011, 12 pages.

Notice of Allowance for U.S. Appl. No. 11/529,980, Mailed Mar. 3, 2011, 19 pages.

* cited by examiner

TRACING OPERATIONS IN MULTIPLE COMPUTER SYSTEMS

TECHNICAL FIELD

Embodiments of the invention generally relate to the field of computer systems and, more particularly, to a method and apparatus for tracing operations in multiple computer systems.

BACKGROUND

In computer operations, it is often necessary to determine why a computer application did not operate as expected. For example, an incorrect result may be provided by the application, the application may require excessive execution time or memory consumption, or the application may otherwise provide operate in an inadequate manner. The result provided by the computer application isn't always helpful in determining what may have occurred in the operation of the computer application.

One process that may be used to determine what occurred in the operation of a computer application is a performance trace. The performance trace may include a process for obtaining the values of the variables used by the application in operation, which may provide clues regarding where problems may be present.

However, in a complex system, a computer application may not be simply running on a particular system, but may rather be required to run on multiple different systems of different types. This type of distributed operation can increase the power and efficiency of operation, allowing the application to utilize each relevant resource in a single overall process, but the distributed application operation also complicates the analysis process if a problem does occur. In this landscape, it is generally not possible to obtain a complete picture of the overall process through a performance trace or similar tool. The systems used by the computer application may be incompatible and may handle their operations in different manners, thereby making it difficult to generate a complete analysis of the application operation.

SUMMARY OF THE INVENTION

A method and apparatus for tracing operations in multiple computer systems.

In one aspect of the invention, a method includes running a computer application, with the computer application operating on multiple computer systems, including a first system and a second system. The first system and the second system have different computer environments. A trace of the computer application is performed, with performance of the trace including enabling a first trace of the first system and enabling a second trace of the second system. Trace data is collected from the first system and the second system during the operation of the application, and the trace data from the first system and the trace data from the second system are combined.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to tracing operations in multiple computer systems.

As used herein, a "trace" or "performance trace" is a process for obtaining data regarding the operation of a computer application. A "trace" includes a method to check the functioning of a computer program by obtaining values of certain variables used by the application in operation.

As used herein, an "end to end trace" is a trace that involves an application operating in multiple systems.

As used herein, an "administration system" or "administrative unit" means a system for administration of a server. The duties of an administration system include the operation of traces of computer applications. An administration system includes the NetWeaver Administrator (NWA) of SAP AG, which is a web-based tool that provides an interface for the SAP NetWeaver system.

As used herein, a "cluster of servers" is a group of independent servers running operating collectively as a single system. In general, a cluster of servers appears to a client as a single server instance.

As used herein, "managed bean" or "MBean" is a Java program object to manage a resource, such as an application, a service, a component, or a device.

As used herein, a "URL" or "uniform resource locator" is an HTTP (Hypertext Transfer Protocol) address that specifies a resource on the Internet. A URL for an Internet resource instructs a browser program regarding where to the Internet resource.

In an embodiment of the invention, a trace is conducted on a computer application operating in multiple systems of different types. In an embodiment, a performance trace operation is conducted in each selected system, and the results are combined to form an end to end trace of the operation of the application.

In a user's computer landscape there may be many systems which vary greatly. It has become a more common practice for computer solutions to be spread over many components distributed on several systems, which may include systems of different types using different computer environments. However, such operations can create complications when problems occur. For example, identifying a problem can be extremely difficult in such an environment. A trace of any particular system or type of system will not contain all aspects of the operation, and the coordination and analysis of multiple independent traces can be very difficult.

In an embodiment of the invention, an end to end trace may be used to assist in finding problems in distributed systems. The systems involved in the operation of an application may be of any kind. In one example, the distributed systems may include a first system and a second system. The first system may be a Java system, such as a J2EE (Java 2 Platform, Enterprise Edition) environment (as described in the Java 2 Platform Enterprise Edition, v. 1.4 API Specification and related specifications). The second system may be, for example, a proprietary system such as the ABAP (Advanced Business Application Programming) system of SAP AG. However, embodiments of the invention are not limited to any particular number or type of systems, and may include the monitoring of other types of computer environments.

In a particular embodiment of the invention, a vendor may provide a customer with a solution that operates on separate systems, with such systems being in communication with each other. For example, a user call may go to a Java stack of a web application server on one system, and a call to ABAP stack of another system may then be made. If the application does not operate properly, it may be difficult to determine on which system the problem has occurred, or what exactly the problem is. In an embodiment of the invention, an end to end trace starts different traces on all of the systems in the cluster of servers in order to provide data from all of the involved systems that may relate to the problem. In an embodiment of the invention, an end to end trace may use common trace format for storing trace data to assist in troubleshooting. (The common format may be referred to as common performance trace, or CPT.) The resulting trace data is stored in a database of a central system, which may be in the common trace format, where the data can be analyzed in multiple different ways.

In an embodiment of the invention, a performance trace system includes an administration system, the administration system having duties that include the implementation and management of end to end traces. The administration system includes modules for the operation of end to end traces, includes modules for the import of trace data from each type of system. The administration system further includes a JMX (Java management extensions) provider to provide JMX interfaces. As used herein, JMX includes the relevant JMX standards, including the JMX v. 1.2 specification. JMX is utilized to instrument, manage, and monitor server components, including services, interfaces, and libraries, and computer applications.

In an embodiment of the invention, data for a performance trace is correlated to connect the data to the trace. In an embodiment, an element which may be referred to as a "passport" is sent with communications to identify and distinguish the end to end trace. In an embodiment, the passport includes a unique correlation ID that is used to correlate data for any particular performance trace. In an embodiment, the passport is a DSR (distributed statistics record) passport, where distributed statistics records are records to enable monitoring of the performance of a system. The DSR passport may be created on the first system on which tracing begins, and distributed with the trace such that the correlation ID is passed to each system. In an embodiment, the distribution of the passport may be utilized in multiple different types of systems, including, for example, J2EE systems and the SAP ABAP system. In an embodiment of the invention, an end to end trace of a computer application is implemented by correlating the traces in each system to allow formation of an overall trace result, with a passport being sent together with every communication for the end to end trace in the format that is appropriate for each traced system.

In an embodiment of the invention, the process of correlation varies with the system and tracing process. In an embodiment of the invention, correlation objects may be used to identify the path of a user activity and then to display which systems are involved. In JARM (Java Application Response Time Measurement) and SQL traces an end to end trace may operate with the assistance of a trace correlator object that is used to analyze trace records that originate from different software components.

A correlator defines a semantic group, which may be used to assist in understanding how traces relate to each other. In an example, a user activity for an application may trigger several requests that are processed by multiple different components. In an embodiment, a system will run an application on multiple systems, collect traces from each of the systems, and merge and analyze the traces. In this process, abstract correlated objects are introduced to allow end-to-end analysis of the user objects, which may be processed by many components running on various different host systems. The correlation objects are used to combine trace data from different sources, and may be serialized over a network and transferred via the appropriate metadata for each communication protocol. The correlators for each trace may include, for example, a passport identification, a user name (to attach the trace to a particular user), and a transaction name (to identify a particular transaction, such as particular run of an application).

A session with a parameter will be aware that the session is a trace session, and the application tracing service will write trace data for the session. If there are no parameters, then the application tracing service will not write trace data for the session. In an embodiment, slowdown of a system due to tracing is reduced because it is only necessary to write trace data for enabled session, and not for all operations.

In the Java stack the passport is maintained by the DSR service and corresponds to a security session. In other, non-Java systems, in general traces will be written for all operations of the server during the performance trace. The correlator then is used to correlate data, such that only relevant data is seen. In ABAP, the passport is a specific correlator object that exists in an ABAP word and that corresponds to a particular a new LUW (logical unit of work). The passport may include a GUID, which is a unique identifier or key for the trace session. If other types of systems are involved in a performance trace, the passport would be supported by as required in the system.

In a possible example, a user may run a process on multiple systems and determine that an error or other issue has arisen with regard to such process. The user then may select the systems to be traced from an administration system and start a new trace activity. The user may further select the types of traces to be run. The user then runs any relevant test cases, and each monitored system traces all actions within the trace request. The user may then stop the trace activity. The system then collects and merges the trace data from all of the selected systems to allow for analysis of the collected data. The resulting combine result then may be viewed by the user.

In an embodiment of the invention, end to end traces may vary in kind, and a user may be provided with certain choices regarding the type of trace to be implemented. In an embodiment of the invention, an end to end trace may be either an activity trace (in which the application to be traced is identified for tracing) or a static trace (in which all records for all applications running on selected systems are written). The specific types of performance traces that are enabled may vary in different embodiments of the invention. In an embodiment of the invention, an activity trace request may include a level of trace, with the level of trace affecting the type of data that is gathered in each system. For example, the trace may be high level, medium level, or low level trace. In an embodiment, the effect of the trace levels could vary between different systems because of the different types of system environments. In addition, it is possible that different trace levels may be assigned to different systems. In one possible example, for a trace of Java and ABAP systems, an end to end activity trace may provide the following trace levels:

(1) Low—Enables only SQL (Structured Query Language) trace. The trace data may apply to both Java SQL and ABAP SQL traces.

(2) Medium—Enables SQL trace for both Java and ABAP systems, and in addition enables JARM (Java Application Response Time Measurement) trace for Java systems.

(3) High—May enable additional traces for either or both systems.

The particular types of traces that are implemented in an end to end trace, which thus defines the type of data that is collected, may include any type of trace that is compatible with the systems that are being monitored. Such traces include, but are not limited to, SQL traces (performance traces written by an open SQL layer containing information about database activities triggered by applications), IS (Introscope) transaction trace (performance trace based on byte code modification available in Wily Introscope, a tool for monitoring Java applications), RFC (remote function call) traces (performance traces written by RFC protocol implementation for ABAP containing information about communications), and Stattrace (designating a functional trace for an ABAP system). However, the traces provided herein are only certain examples that are applicable to Java and ABAP monitored systems, and embodiments of the invention may also utilize any other trace that is appropriate for a particular monitored computer environment.

In an embodiment of the invention, a request for a trace may include a certain duration. The duration may be, for example, the length of all trace operations in milliseconds, and may represent the difference between the start time and the end time for the trace. In another embodiment, the trace may simply be started without a set end time, and may be ended when a command is received to stop the trace.

In an embodiment of the invention, a system may optionally include an HTTP proxy for use in collecting client statistics. In an embodiment, an HTTP proxy listens to requests from a browser to the system in order to measure time that is lost in network communication. If an HTTP proxy is used, client data is uploaded to the administration system. In an example, an HTTP proxy application may be installed on a system, such as specifically in a computer on which a browser is opened for the operation of a trace. The proxy may be used to measure client rendering and network traffic after a response from a server is returned. In this example, resulting end data then may include HTTP requests with duration time values for rendering time, network time, and server time.

In an embodiment of the invention, a monitored system includes such import modules as are needed to generate and transfer trace data for the relevant systems. For example, a J2EE monitored server includes an MBean (managed Java bean) server, and utilizes an MBean to provide trace models. An MBean is a Java object that represents a manageable resource, such as an application, a service, a component, or a device. In an embodiment of the invention, an ABAP monitored server includes a CCMS (Computer Center Management) agent and an administration system includes a CCMS system. CCMS refers to the ABAP based monitoring infrastructure of SAP AG. Other types of servers may include other types of import modules needed to obtain and transfer data collected in trace operations.

In an embodiment of the invention, an end to end trace result is generated from the correlated traces of multiple different systems. The trace result may be represented as a display for a user. The display of trace results may include display that illustrates how the time was used in the application operation and how it was distributed among different application elements.

In an embodiment of the invention, a user interface may be provided for a user to request traces and to obtain the results for analysis. In an embodiment, the user interface may utilize a web-based system, and may operate in conjunction with a web-based administration unit. This may be implemented as, for example, a Web Dynpro application in a NetWeaver administrator plug-in. However, embodiments of the invention are not limited to any particular interface process for a user.

Figure 1:
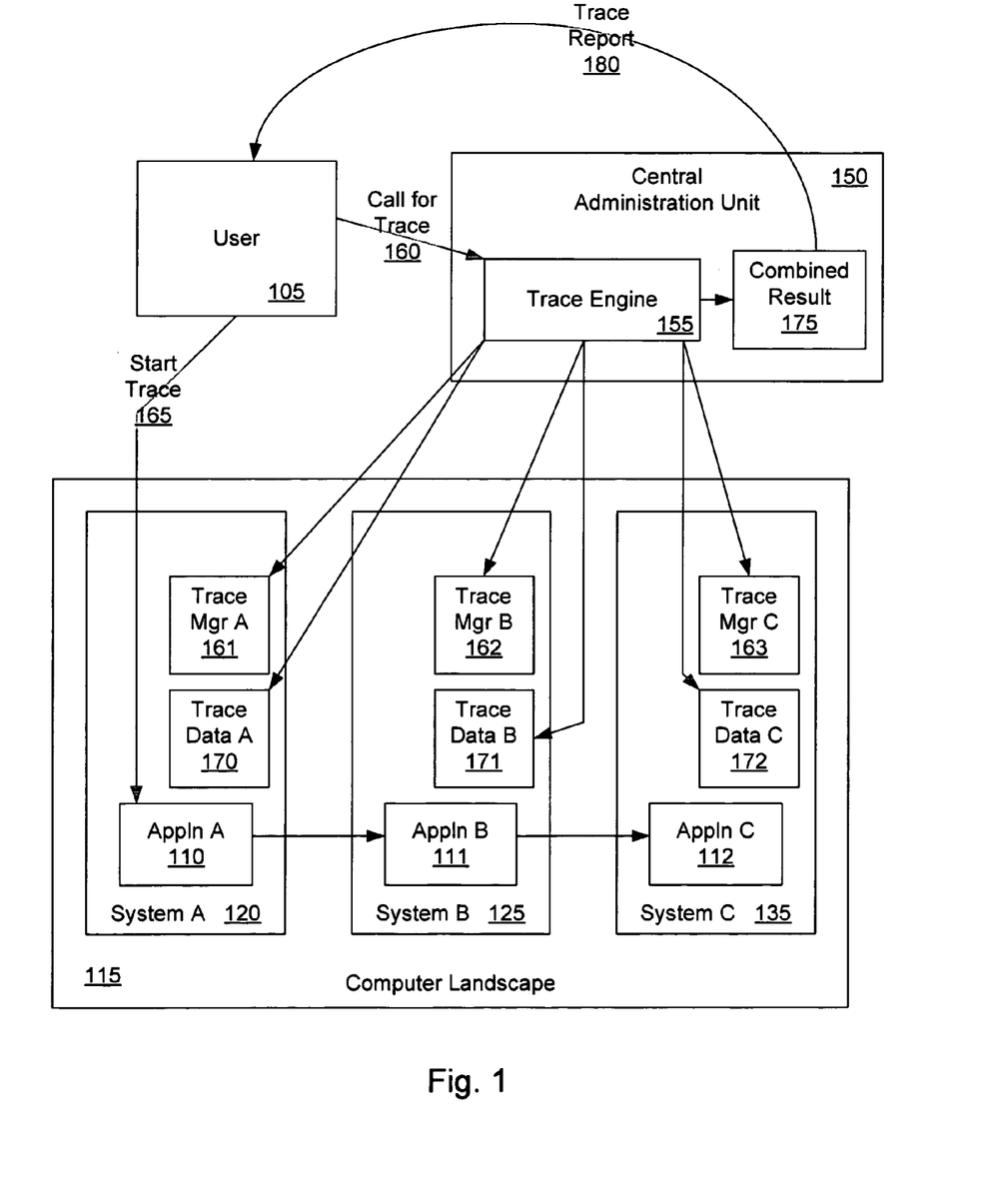
FIG. 1 is an illustration of an embodiment of an architecture of a trace system.

FIG. 1 is an illustration of an embodiment of an architecture of a trace system. In this illustration, user 105 may operate a computer application in a computer landscape. The user may be an individual in certain circumstances, or may be an automated unit or system. In an embodiment, the user 105 may call a computer application may in a computer landscape 115 that may include multiple different systems of different types. For example, in the computer landscape 115, the user may call a computer application A 110 in a system A 120. In operation, computer application A may then call computer application B 111 in system B 125, which, for example, may call computer application C 112 in system C 135. Thus, in this example, the operation of a computer application operates in systems A, B, and C. If the computer application does not operate properly for any reason, it may be necessary to conducts traces of the computer application as applied in each of the affected systems.

In an embodiment of the invention, a central administrator unit 150 includes a trace engine 155 that may be used to provide a trace of each of the affected systems. If the user 105 calls for a trace 160 in each of the systems, the trace engine 155 takes action to initiate a trace on each of the affected systems. In an embodiment, the trace engine 155 opens a trace manager in each system to collect data, as shown in FIG. 1 as trace manager A 161 in system A 120, trace manager B 162 in system B 125, and trace manager C 163 in system C 135. The method of initializing the trace may vary in different circumstance, and different types of traces may be requested depending on the circumstances and the needs of the user 105. In an embodiment, the trace is started by the user 105 making a call to computer application A 110.

Upon initiating the trace, trace data will be generated for each affected system, shown here as trace data A 170 for system A 120, trace data B 171 for system B 125, and trace data C 172 for system C 135. In an embodiment of the invention, the sets of trace data may utilize a common trace format (CPT—common performance trace), or may be converted to such a common trace format. In an embodiment of the invention, the trace engine 155 will combine the sets of trace data into a combined trace result 175. The combined trace result 175 then may be used to generate a trace report 180 for analysis by system user 105.

Figure 2:
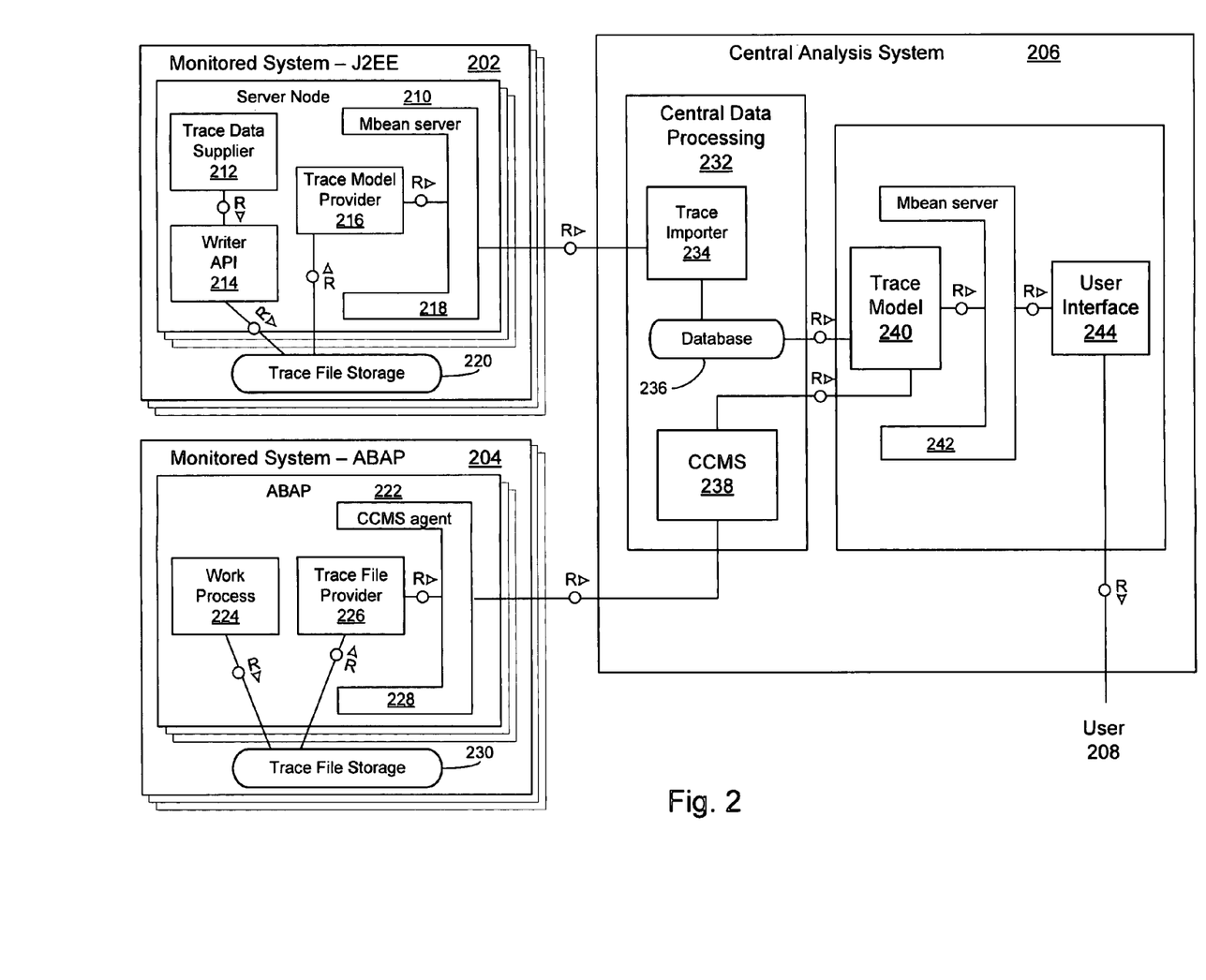
FIG. 2 is an illustration of components of an embodiment of the architecture of an end to end trace system.

FIG. 2 is an illustration of components of an embodiment of the architecture of an end to end trace system. FIG. 2 and the other figures herein are provide to illustrate embodiments of the invention, and do not contain all elements that may be present in a system or apparatus. In this illustrated example, a central analysis system 206 (which may be part of an administration system) will provide trace support for one or more J2EE monitored systems 202, each one of which may include one or more server nodes, and one or more ABAP monitored systems, each one of which may include an ABAP server. In an embodiment, in tracing a J2EE system utilizes instrumented code that creates a trace data supplier 212 to write performance trace data via an API 214 (application program interface), which may be an API utilizing a common trace format. In an embodiment, the performance trace data is written to a temporary storage, such as the trace file storage 220 for the J2EE monitored system 202. The system may further include a trace model provider, which may be implemented as an MBean registered to the local system MBean server 218 and which thus allows accessing the trace data from the central analysis system 206.

In an embodiment of the invention, an ABAP monitored system 222 includes a CCMS agent 228 that allows CCMS 238 to access trace data for the local ABAP system, which is collected by a work process 224 and storage in a temporary storage, shown as trace file storage 230. The use of CCMS functional modules allows retrieval of ABAP traces.

The central analysis system 206 includes a central data processing module 232 to retrieve trace data from the local systems, such as the J2EE monitored system and the ABAP monitored system. The central data processing system 232 may import mechanisms to obtain the trace data from the local systems, such as a trace importer module 234 to obtain trace data from J2EE systems, with the data then being stored in a database 236, and a CCMS system 238 to obtain trace data from ABAP systems. If traces are performed in other types of systems then the central analysis system 206 may include other types of import mechanisms. After being retrieved from a local server, such traces may be integrated into a central trace model 240 by retrieving the trace data from the database 236 and by performing RFC calls to CCMS system 238. The trace model 240 enables the end to end trace data, allowing for access to the trace data in a convenient manger for a user interface 244 via an MBean server 242, providing merged data from Java and ABAP sources, and providing for data filtering and aggregation of the data.

Figure 3:
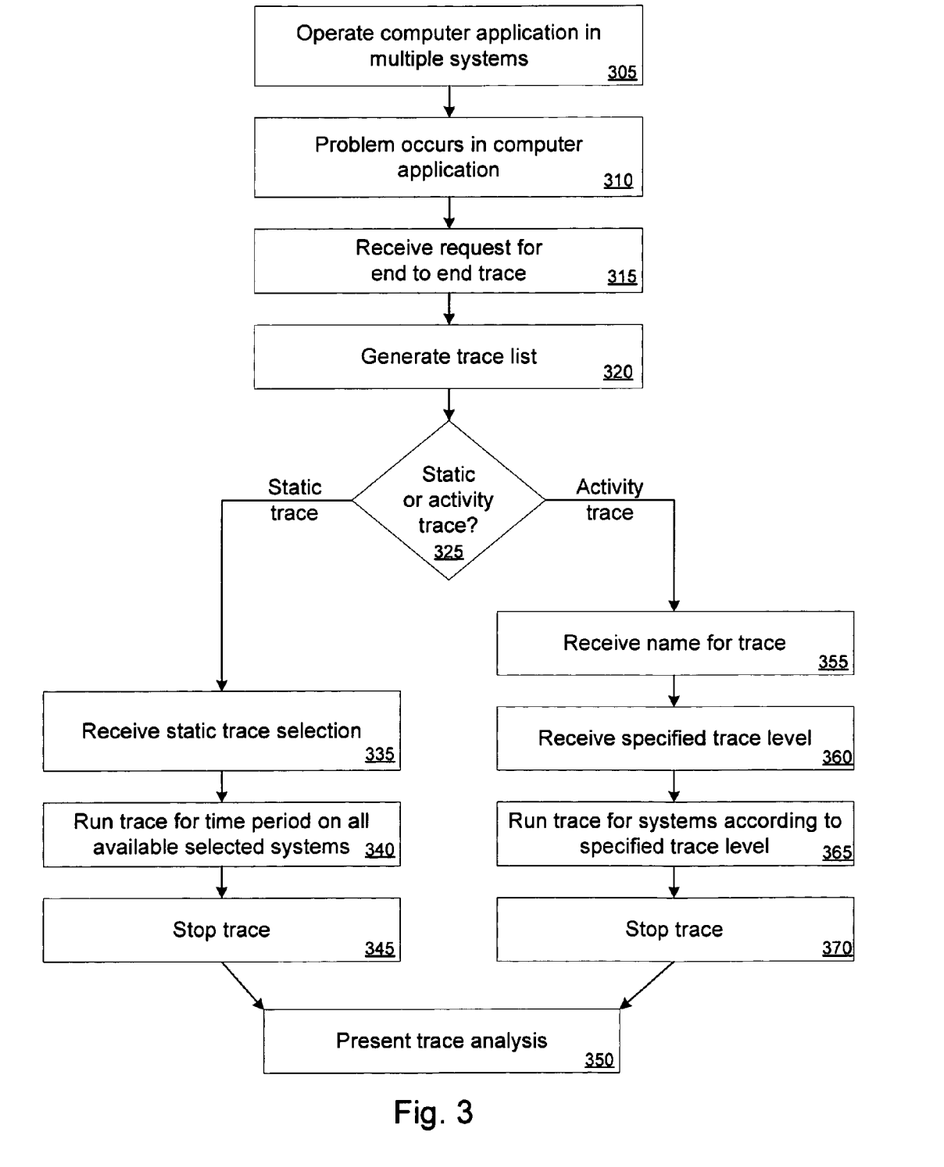
FIG. 3 is flowchart to illustrate an embodiment of a trace process.

FIG. 3 is flowchart to illustrate an embodiment of a trace process. In a general case, a computer application may be operated in multiple systems 305. A problem may arise in the computer application 310, which may be any type of performance issue that requires investigation. A request for an end to end trace may be received 315, and a trace list may be generated to reflect the systems that require trace operations.

In an embodiment of the invention there may separate processes for a static trace and an activity trace 325. If the trace is designated as a static trace, then a selection of a static trace is received 335. In an embodiment, the trace is run for a time period on all available selected systems 340. The trace is then stopped, and the trace analysis may be provided 350, such as to a system user. If the trace is designated as an activity trace, then a name for trace is received 355, as well as a trace level 360. The traces levels may vary in different embodiments, and may include, for example, a low level trace, a medium level trace, and a high level trace. The trace is run as requested, and then is stopped 370, and the trace analysis may again be provided 350.

Figure 4:
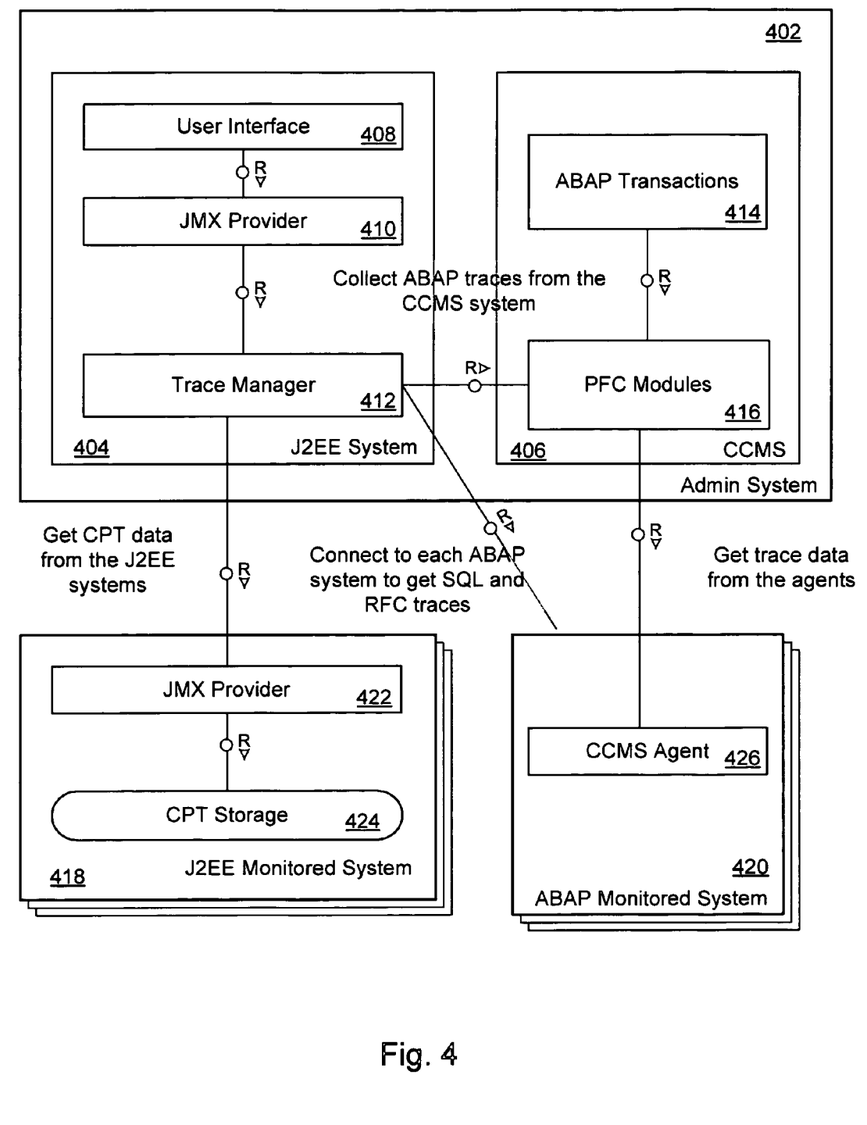
FIG. 4 illustrates an embodiment of a trace system.

FIG. 4 illustrates an embodiment of a trace system. In this illustration, an administration system 402 is responsible for implementing an end to end trace of a computer application, where the computer application includes components running on multiple systems. For example, in the implementation of a trace there may be one or more J2EE monitored systems 418 and one or more ABAP monitored systems 420. The administration system 402 may include a J2EE system element and a CCMS element 406. Within the J2EE element 404 of the administration system 402 there may be a user interface 408, which may include, but is not limited to, a Web Dynpro application. The user interface 408 is coupled with a JMX provider, which may provide for messaging. The J2EE element 404 then includes a trace manager 412 to manage operations. The administration system 402 further includes a CCMS system, including a module for ABAP transactions 414 and PFC modules 416.

In the illustrated embodiment, the trace manager 412 of the administration system 402 is coupled with each J2EE monitored system 418 via a JMX provider 422 to obtain Java system trace data. The J2EE monitored systems each include a storage for trace data, which may include a common trace format data storage shown as the CPT storage 424. The administration system is further coupled with each ABAP monitored system 420 to obtain ABAP trace data. Each ABAP monitored system includes a CCMS agent 426, which provides for communication with the CCMS system 406 of the administration system 402. In an embodiment, the format of the ABAP system traces may vary and may require translation to a common trace format, such as CPT.

In an embodiment of the invention, the administration system is to initiate a trace on each affected J2EE monitored system 418 and ABAP monitored system 420. Each such system will trace the application operation, and collect the relevant trace data. The administration system 402 via the trace manager 412 will gather the trace data from each system, correlate the data together, and create a result reflecting an end to end trace of the application.

Figure 5:
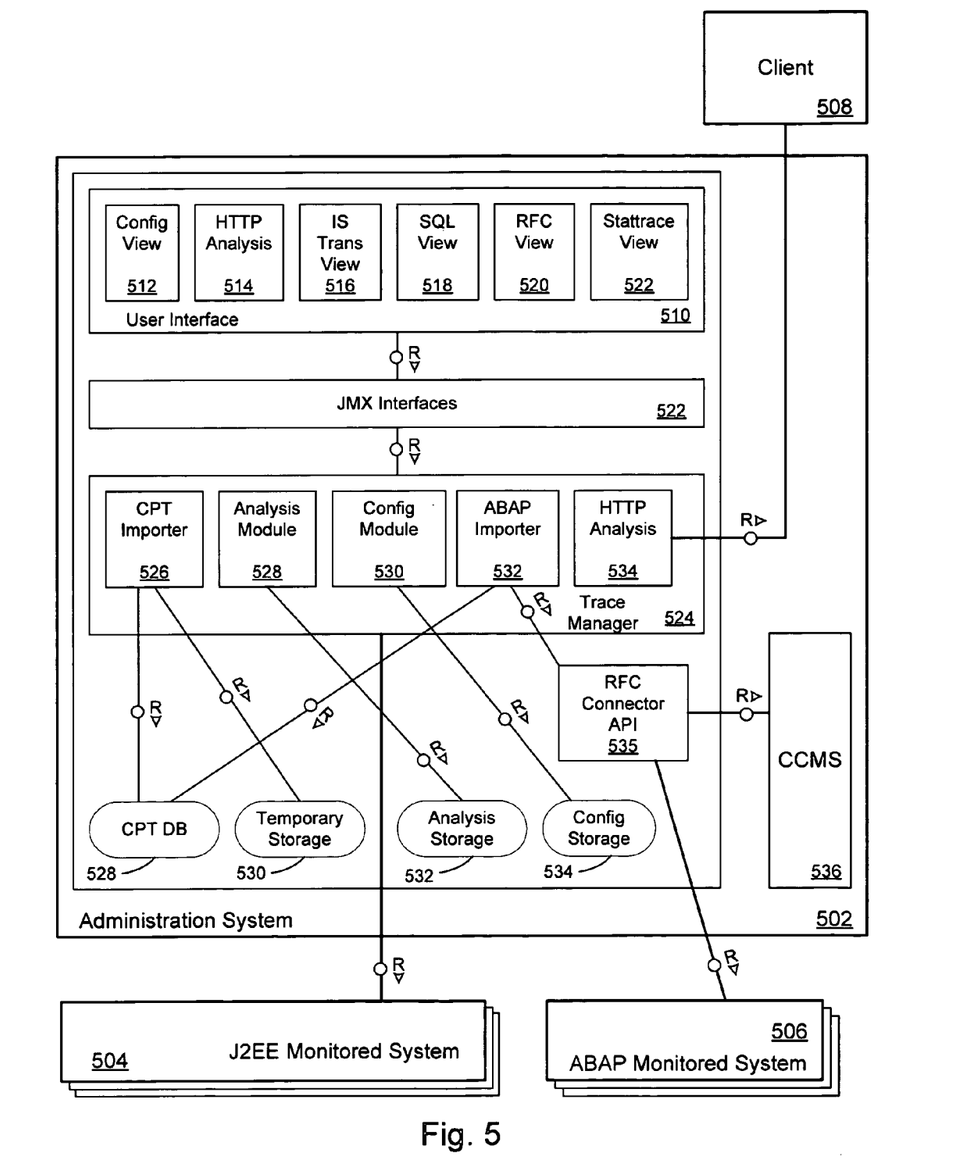
FIG. 5 is an illustration of an embodiment of an administration system that implements end to end traces.

FIG. 5 is an illustration of an embodiment of an administration system that implements end to end traces. The illustrated trace system provides details for an embodiment of system that may include the elements illustrated in FIG. 4. As illustrated, an administration system 502 is responsible for trace operations for a client 508 operating an application on one or more J2EE monitored systems 504 and one or more ABAP monitored systems 506. The J2EE monitored systems are coupled with a trace manager 524, and the ABAP monitored systems 506 are coupled to a CCMS system 536 via an RFC connector API 535. The API 535 is a proxy of the RFC function modules and creates a general framework for connection to the ABAP systems. The API connects to the CCMS system on administration system and to all ABAP monitored systems.

In this illustration, the trace manager 524 includes a number of modules for trace operations. The trace manager 524 may include a configuration module 530, which contains methods for starting and stopping trace activities, and that maintains general information about the trace activities (such as name, start and end data, and filters) in a configuration storage 534. The modules may include an ABAP importer 532 to import the ABAP trace data via the RFC connector API 535 to a database 528, which may be a CPT (common performance trace) database. In addition, the trace data from the J2EE monitored systems 504 is stored in a temporary storage 530. The trace manager 524 further includes a CPT importer 526, which obtains the trace data from the J2EE monitored systems 504 stored in the temporary storage, and imports the data to the database 528.

In one embodiment, the trace manager 524 may include a HTTP analysis module. If an HTTP proxy is used on the client side 508, then several XML files will be generated. These files are uploaded to the administration system 502, and, with the help of a responses.trc file that is generated by the HTTP service, the HTTP analysis is generated and imported to the database 528.

After the trace is stopped, the trace data is collected from the monitored system and imported to the database 528. In an embodiment, this data may then be analyzed by the analysis module and may be stored in a separate analysis storage 532.

Also illustrated are the JMX interfaces 522 to provide the link between the trace manager 524 and a user interface 510, which may include a Web Dynpro application. Contained within the user interface may be multiple views for the user to perform traces and analyze results, including a configuration view 512, an HTTP analysis view 514, an IS (Introscope) transactions view 516 a SQL view 518, an RFC view 520, and a Stattrace view 522.

Figure 6:
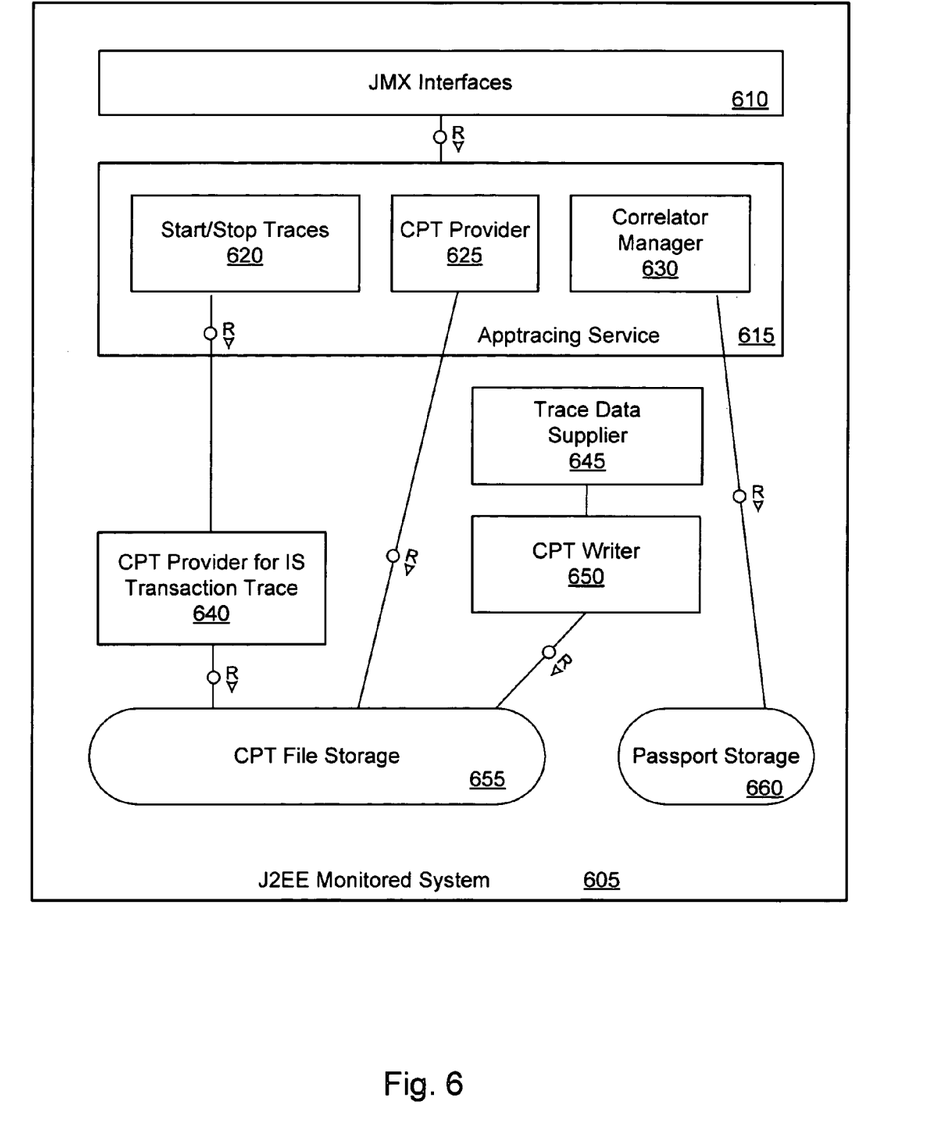
FIG. 6 illustrates an embodiment of a J2EE monitored system.

FIG. 6 illustrates an embodiment of a J2EE monitored system. In an embodiment of the invention, a J2EE monitored system 605 includes JMX interfaces 610, which are utilized in messaging. Coupled with the JMX interfaces 610 is an application tracing service, referred to as apptracing service 615. In an embodiment, the apptracing service 615 includes modules for operation of performance traces. The apptracing service 615 may include a Start/Stop traces module 620, which will start a trace when a request with trace parameters is received and stop a trace when time for a trace expires or the end of the trace is otherwise directed. The module 620 will also set the appropriate flags in a corresponding DSR passport for the trace. The apptracing service 615 may further include a CPT provider to provide methods for transferring CPT files to the administration system using JMX streaming. Further, the apptracing service 615 may include a correlator manger that is responsible for the creation of the correlators for the trace records.

The apptracing service 615 is coupled with an IS transaction service 635. Coupled with the IS transaction service 635 is CPT provider for an IS transaction trace 640, which makes available an API to trace data in CPT files. The CPT provider 640 is then coupled with a CPT file storage 655 for temporary storage of trace data. The CPT file storage is also coupled with the CPT provider 625 and a CPT writer, receiving data from a trace data provider 645. Further, the J2EE monitored system may include a passport storage 660 to store passports received as correlators for performance traces. The passport storage 660 is coupled with the correlator manager of the apptracing service 615.

Figure 7:
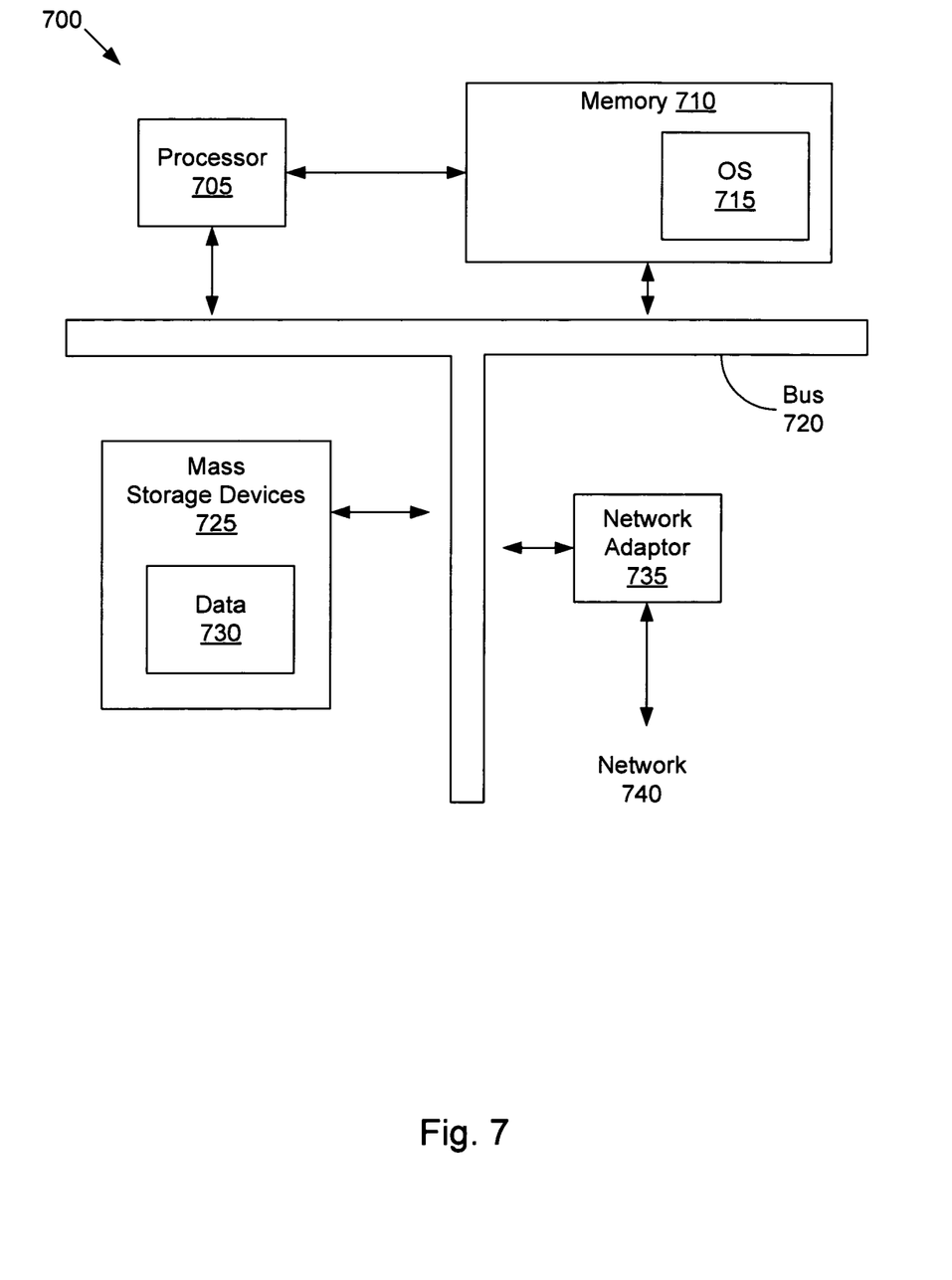
FIG. 7 is an illustration of a computer system in an embodiment of the invention.

FIG. 7 is an illustration of a computer system in an embodiment of the invention. A computer system may include a system for which an end to end trace is implemented. The computing system illustrated in FIG. 7 is only one of various possible computing system architectures, and is a simplified illustration that does include many well-known elements. As illustrated, a computing system 700 can execute program code stored by an article of manufacture. Computer system 700 may be a J2EE system, ABAP system, or administration system. A computer system 700 includes one or more processors 705 and memory 710 coupled to a bus system 720. The bus system 720 is an abstraction that represents any one or more separate physical buses, point-to-point connections, or both connected by appropriate bridges, adapters, or controllers. The bus system 720 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto).

As illustrated in FIG. 7, the processors 705 are central processing units (CPUs) of the computer system 700 and control the overall operation of the computer system 700. The processors 705 execute software stored in memory 710. A processor 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 710 is or includes the main memory of the computer system 700. Memory 710 represents any form of random access memory (RAM), read-only memory (ROM), flash memory, or the like, or a combination of such devices. Memory 710 stores, among other things, the operating system 715 of the computer system 700.

Also connected to the processors 705 through the bus system 720 are one or more internal mass storage devices 725 and a network adapter 735. Internal mass storage devices 725 may be or may include any conventional medium for storing large volumes of instructions and data 730 in a non-volatile manner, such as one or more magnetic or optical based disks. The network adapter 735 provides the computer system 700 with the ability to communicate with remote devices, over a network 740 and may be, for example, an Ethernet adapter.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
running a computer application having a plurality of components including a first component and a second component, the components of the computer application operating on a plurality of computer systems, the plurality of computer systems including a first system running the first component and a second system running the second component, the first system and the second system having different computer environments;
generating a trace correlator for an end to end trace of the operation of the computer application, the end to end trace of the computer application being a trace of the computer application over each of the plurality of computer systems on which the computer application is running, the trace correlator being an identifying data object transferred with a first communication sent to the first system for a trace of the first component running on the first system and with a second communication sent to the second system for a trace of the second component running on the second system, the trace correlator including an identification for the end to end trace of the computer application, the first communication being sent in a format appropriate for the first computer system and the second communication being sent in a format appropriate for the second computer system;
performing the end to end trace of the operation of the components of the computer application on the plurality of computer systems, performing the trace including enabling a first trace of the first component of the computer application running on the first system and enabling a second trace of the second component of the computer application running on the second system;
collecting a set of trace data from the trace of each of the components of the computer application, including a first set of trace data from the trace of the first component running on the first system and a second set of trace data from the trace of the second component running on the second system, during the operation of the computer application; and
combining the sets of trace data from each system, including the first set of trace data from the first system and the second set of trace data from the second system, to generate a combined trace result for the components of the computer application, wherein combining the first set of trace data and the second set of trace data includes utilizing the trace correlator to correlate each set of trace data with the end to end trace.

2. The method of claim 1, wherein performance of the trace of the computer application includes collection of values of variables used by the components of the computer application in operation.

3. The method of claim 1, wherein the trace correlator is contained in metadata for the first trace of the first component running on the first system and for the second trace of the second component running on the second system.

4. The method of claim 1, wherein the first system is a Java system.

5. The method of claim 4, wherein the second system is a proprietary system.

6. The method of claim 5, wherein the second system is an ABAP (Advanced Business Application Programming) system.

7. The method of claim 1, wherein first system and the second system are parts of a landscape of systems.

8. A performance trace system comprising:
an administration unit, the administration unit to manage a trace of a computer application having a plurality of components running on a plurality of systems, including a first component of the computer application running on a first system and a second component of the computer application running a second system, the administration unit including a first import module for trace data generated for the first system and a second import module for trace data generated for the second system, the first system and the second system having different computer environments;
a first trace element implemented in the first system to collect a first set of trace data from a trace of the operation of the first component and provide the first set of trace data via the first import module; and
a second trace element implemented in the second system to collect a second set of trace data from a trace of the operation of the second component and provide the second trace data via the second import module;
wherein the administration system uses a trace correlator to identify data for an end to end trace of the computer application on the plurality of systems, the end to end trace of the computer application being a trace of the computer application over each of the plurality of systems on which the computer application is running, the trace correlator being an identifying data object that is included with a first communication sent to the first system for a trace of the first component running on the first system and with a second communication sent to the second system for a trace of the second component running on the second system, the trace correlator including an identification for the end-to-end trace of the computer application, the first communication being sent in a format appropriate for the first computer system and the second communication being sent in a format appropriate for the second computer system; and
wherein the administration system is configured to combine the first set of trace data from the first system and the second set of trace data from the second system to generate a combined trace result, wherein combining the first set of trace data and the second set of trace data includes utilizing the trace correlator to correlate the first set of trace data and the second set of trace data with the end to end trace.

9. The performance trace system of claim 8, wherein performance of the trace of the computer application includes collection of values of variables used by the components of the computer application in operation.

10. The performance trace system of claim 8, wherein the trace correlator is contained in metadata for the first trace of the first component running on the first system and for the second trace of the second component running on the second system.

11. The performance trace system of claim 8, wherein the administration unit comprises a user interface for trace operations.

12. The performance trace system of claim 11, wherein the user interface is a web application.

13. The performance trace system of claim 8, wherein the administration system includes a trace manager module to manage performance traces.

14. The performance trace system of claim 8, wherein the administration unit includes a JMX (Java management extensions) interface.

15. A computer-readable medium encoded with a computer program having instructions for a performance trace of a computer application, the instructions including:

enabling an end to end performance trace for the computer application, the computer application including a plurality of components running on a plurality of systems, including a first component running on a first computer system and a second component running on a second computer system, the first computer system and the second computer system having different computer environments;

generating a trace correlator for an end to end trace of the computer application, the end to end trace of the computer application being a trace of the computer application over each of the plurality of systems on which the computer application is running, the trace correlator being transferred with a first communication sent to the first system for a trace of the first component running on the first system and with a second communication sent to the second system for a trace of the second component running on the second system, the trace correlator being an identifying data object, the trace correlator including an identification for the end to end trace of the computer application, the first communication being sent in a format appropriate for the first computer system and the second communication being sent in a format appropriate for the second computer system;

running the computer application, including running the first component of the computer application on the first system and the second component on the second system;

collecting sets of trace data from traces of each of the components of the computer application, including collecting a first set of trace data from a trace of the first component on the first system and collecting a second set of trace data from a trace of the second component on the second system; and generating a combined performance trace by combining the sets of trace data, including the first set of trace data from the trace of the first component and the second set of trace data from the trace of the second component, to generate a combined trace result, wherein combining the first set of trace data and the second set of trace data include utilizing the trace correlator to correlate the first set of trace data and the second set of trace data with the end to end trace.

16. The medium of claim 15, wherein the trace correlator is contained in metadata for the trace of the first component running on the first system and for the trace of the second component running on the second system.

17. The medium of claim 15, wherein the first system is a Java system.

18. The medium of claim 15, wherein the second system is an ABAP (Advanced Business Application Programming) system.

19. The medium of claim 15, wherein performance of the trace of the computer application includes collection of values of variables used by the components of the computer application in operation.

* * * * *